United States Patent
Rudofski et al.

(10) Patent No.: US 12,461,616 B1
(45) Date of Patent: Nov. 4, 2025

(54) REAL-TIME SYNCHRONIZATION BETWEEN A PHYSICAL ENTITY AND A MIXED REALITY ENVIRONMENT

(71) Applicant: GM GLOBAL TECHNOLOGY OPERATIONS LLC, Detroit, MI (US)

(72) Inventors: Stephen Rudofski, West Bloomfield, MI (US); Danni Zhang, Auburn Hills, MI (US); Ramtin Parvizi, Windsor (CA); Robert Ondrus, Northville, MI (US); Luciano L. Oetting, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/928,326

(22) Filed: Oct. 28, 2024

(51) Int. Cl.
*G06F 3/038* (2013.01)
*G06F 3/0346* (2013.01)
*G06T 11/00* (2006.01)

(52) U.S. Cl.
CPC ............. *G06F 3/038* (2013.01); *G06F 3/0346* (2013.01); *G06T 11/00* (2013.01); *G06T 2200/24* (2013.01)

(58) Field of Classification Search
CPC ........ G06F 3/038; G06F 3/0346; G06T 11/00; G06T 2200/24
See application file for complete search history.

(56) References Cited

U.S. PATENT DOCUMENTS

| | | | | |
|---|---|---|---|---|
| 5,625,576 A | * | 4/1997 | Massie | G06F 3/016 703/6 |
| 2018/0089900 A1 | * | 3/2018 | Rober | B60K 35/26 |
| 2019/0361589 A1 | * | 11/2019 | Yerli | B25J 9/1689 |
| 2020/0249654 A1 | * | 8/2020 | Edwards | B25J 9/1671 |
| 2021/0241534 A1 | * | 8/2021 | Avisar | G06T 19/003 |

(Continued)

FOREIGN PATENT DOCUMENTS

| | | |
|---|---|---|
| CN | 116946876 A | 10/2023 |
| DE | 102005061211 A1 | 9/2006 |

(Continued)

OTHER PUBLICATIONS

Tu, X.; Autiosalo, J.; Jadid, A.; Tammi, K.; Klinker, G. A Mixed Reality Interface for a Digital Twin Based Crane. Appl. Sci. 2021, 11, 9480. https://doi.org/10.3390/app11209480 (Year: 2021).*

*Primary Examiner* — Bryan Earles

(74) *Attorney, Agent, or Firm* — Quinn IP Law

(57) ABSTRACT

An apparatus includes a physical entity operatively connected to a plurality of sensors. A microcontroller is configured to map a respective baseline position of the sensors. A virtual reality (VR) controller is adapted to create a digital twin of the physical entity. The microcontroller receives sensor data from the plurality of sensors and converts the sensor data into a respective position value. The microcontroller is adapted to determine, in a predefined priority order, if the respective position value has deviated from the respective baseline position. The VR controller generates an updated digital twin by updating a respective virtual position value in the digital twin based on a unique letter code. The updated digital twin is transmitted to a virtual reality medium or a mixed reality medium, operation of the physical entity being controlled in real-time based in part on the updated digital twin.

20 Claims, 4 Drawing Sheets

(56) References Cited

U.S. PATENT DOCUMENTS

2023/0115586 A1\* 4/2023 Song .................. E02F 9/261
                                                    701/50
2024/0003673 A1\* 1/2024 Steiner ............. G01B 21/047
2025/0032926 A1\* 1/2025 Spoof ................ A63F 13/65

FOREIGN PATENT DOCUMENTS

DE      102023113630 A1    11/2023
EP           1440414 B1 *   8/2016   ............. G06G 7/48
KR      1020190115810 A    10/2019

\* cited by examiner

REAL-TIME SYNCHRONIZATION BETWEEN A PHYSICAL ENTITY AND A MIXED REALITY ENVIRONMENT

INTRODUCTION

The present disclosure relates generally to real-time synchronization between a physical entity and a mixed reality environment. More specifically, the disclosure relates to an apparatus and corresponding method of controlling a physical entity based on the real-time synchronization between the physical entity and a mixed reality environment. A mixed reality environment incorporates real-world physical properties into a virtual overlay. Physical property generally refers to the real-world attributes of an object. Mechanisms for incorporating real-world physical properties into a virtual overlay generally employ optical detectors for tracking physical properties. However, data from the optical detectors is dependent on environmental conditions and may be obscured in some circumstances.

SUMMARY

Disclosed herein is an apparatus having a physical entity and a plurality of sensors operatively connected to the physical entity. A microcontroller is integrated with the physical entity and includes a first processor and a first tangible, non-transitory memory. The microcontroller is configured to map a respective baseline position of the plurality of sensors. A virtual reality (VR) controller is in communication with the microcontroller and having a second processor and a second tangible, non-transitory memory, the VR controller being adapted to create a digital twin of the physical entity.

The microcontroller is configured to receive sensor data from the plurality of sensors, the sensor data being converted into a respective position value. The microcontroller is configured to determine, in a predefined priority order, if the respective position value has deviated from the respective baseline position of an item and create a respective data packet with a unique letter code when the respective position value has deviated. The VR controller is adapted to receive incoming data from the microcontroller and route the incoming data based in part on the unique letter code. The updated digital twin is transmitted to a virtual reality medium or a mixed reality medium, operation of the physical entity being controlled in real-time based in part on the updated digital twin.

The unique letter code may include a first letter encoding an axis of movement of the item, and a second letter encoding an identity of the item, the data packet further including a current numeric position coordinate of the item. Converting the sensor data into a respective position value includes transmitting the sensor data to an analog-to-digital converter for conversion into a respective bit-value. The sensor data is sorted in the predefined priority order. The respective bit-value is converted into the respective position value. The respective bit-value is dependent on a respective output voltage of the plurality of sensors.

In some embodiments, the predefined priority order prioritizes respective items in a predefined field-of-view of a user relative to the respective items that are not in the predefined field-of-view. The VR controller may be adapted to create a first thread and a second thread via a multithreading library such that the first thread processes the incoming data, and the second thread operates a user interface of the VR controller.

The apparatus may include a head-mounted display in communication with the VR controller, with the updated digital twin being transmitted to and displayed on the head-mounted display. The apparatus may include a monitor in communication with the VR controller, with the updated digital twin being transmitted to and displayed on the monitor. The apparatus may include a universal serial bus (USB) port adapted to interface with the microcontroller and the VR controller, the VR controller being adapted to receive the incoming data from the USB port. The plurality of sensors may include an accelerometer and/or a gyroscope. The plurality of sensors include at least one sensor respectively positioned along first, second and third orthogonal axes.

The physical entity may include a seat assembly and a steering wheel assembly. The plurality of sensors may include rotary motion sensors in the steering wheel assembly respectively adapted to indicate steering column rake, steering column telescoping, and steering wheel rotation. The plurality of sensors may include rotary motion sensors in the seat assembly respectively adapted to indicate seat back angle adjustment, seat longitudinal adjustment, and seat height adjustment. In some embodiments, the physical entity includes a foot pedal assembly. The plurality of sensors may include linear actuators in the foot pedal assembly, the linear actuators being adapted to indicate angular adjustment and longitudinal adjustment.

Disclosed herein is a method for controlling operation of a physical entity in an apparatus having a microcontroller with a first processor and a first tangible, non-transitory memory, and a virtual reality (VR) controller having a second processor and a second tangible, non-transitory memory. The method includes connecting a plurality of sensors to the physical entity. The method includes integrating the microcontroller with the physical entity and mapping a respective baseline position of the plurality of sensors, via the microcontroller. The method includes creating a digital twin of the physical entity, via the VR controller, and converting sensor data from the plurality of sensors into a respective position value, via the microcontroller.

The method includes determining, in a predefined priority order, if the respective position value has deviated from the respective baseline position of an item, via the microcontroller. The method includes creating a respective data packet with a unique letter code when the respective position value has deviated from the respective baseline position, via the microcontroller. The method includes receiving incoming position data from the microcontroller and routing the incoming position data based in part on the unique letter code, via the VR controller, and generating an updated digital twin by updating a respective virtual position value in the digital twin based on the unique letter code, via the VR controller. The method includes transmitting the updated digital twin to a virtual reality medium or a mixed reality medium and control operation of the physical entity in real-time based in part on the updated digital twin, via the VR controller.

Disclosed herein is a vehicle including a physical entity and a plurality of sensors operatively connected to the physical entity. A microcontroller is integrated with the physical entity and includes a first processor and a first tangible, non-transitory memory. The microcontroller is configured to map a respective baseline position of the plurality of sensors. A virtual reality (VR) controller is in communication with the microcontroller and having a second processor and a second tangible, non-transitory memory, the VR controller being adapted to create a digital twin of the physical entity.

The microcontroller is configured to receive sensor data from the plurality of sensors, the sensor data being converted into a respective position value. The microcontroller is configured to determine, in a predefined priority order, if the respective position value has deviated from the respective baseline position of an item and create a respective data packet with a unique letter code when the respective position value has deviated. The unique letter code encodes an axis of movement of the item and an identity of the item, the respective data packet including a numeric position coordinate of the item. The VR controller is adapted to receive incoming data from the microcontroller and route the incoming data based in part on the unique letter code. The updated digital twin is transmitted to a virtual reality medium or a mixed reality medium, operation of the physical entity being controlled in real-time based in part on the updated digital twin.

The above features and advantages and other features and advantages of the present disclosure are readily apparent from the following detailed description of the best modes for carrying out the disclosure when taken in connection with the accompanying drawings.

Figure 1:
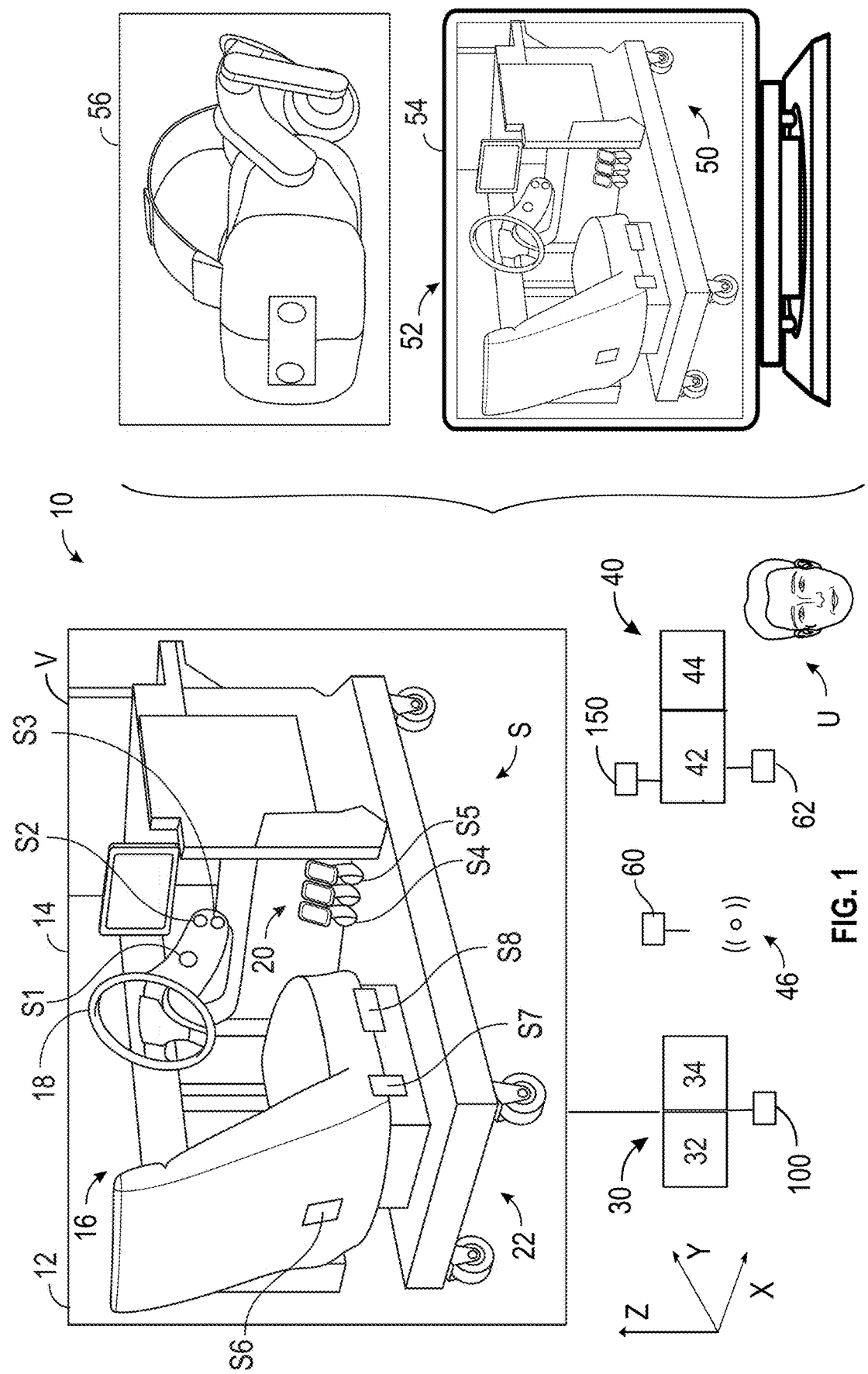
FIG. 1 is a schematic fragmentary diagram of an apparatus having a physical entity, a microcontroller and VR controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an apparatus 10 for controlling operation of a physical entity 12. The physical entity 12 is operatively connected to a plurality of sensors S each respectively positioned at predefined reference points. In other words, the plurality of sensors S are positioned in multiple different axes of the physical entity 12 such that coordinates and positions can be tracked. As described below, these coordinates are then used to align a specific virtual target to reflect the physical entity 12. The sensors S are assigned a priority ranking to determine which virtual targets to update first.

Mechanisms for incorporating real-world physical properties into a virtual overlay generally employ optical trackers to detect the real-world physical properties. However, data from the optical trackers is dependent on the environment and may be obscured in different circumstances. The apparatus 10 eliminates the need for optical trackers. The absence of optical positioning eliminates error from ambient surrounding environment, e.g., reflections, sunlight, darkness, and obscuration.

The apparatus 10 may be employed in a variety of different ways, including virtual reality movement tracking and synchronizing. The apparatus 10 may be employed in design visualization, e.g., visualizing how a virtual product would fit in a physical environment. The apparatus 10 may be employed in training simulations, e.g., practicing tasks on virtual objects.

The apparatus 10 may be employed in industrial procedures such as overlaying digital instructions on real-world machinery and to visualize obstructed components. For example, in some cases, a user U is not able to see a component they are installing as the component may be blocked by another larger component. The user U may employ the head-mounted display 56 (virtual reality or mixed reality) to project the position of the component behind the obstacle.

In the example shown in FIG. 1, the physical entity 12 is a reconfigurable seating assembly 14 having a seat assembly 16, a steering wheel assembly 18, and a foot pedal assembly 20 located on a base structure 22. However, it is to be understood that the physical entity 12 may take different forms and include other components not shown. The reconfigurable seating assembly 14 may be employed for interior and visibility evaluations for a vehicle.

Referring to FIG. 1, the plurality of sensors S may include first, second and third sensors S1, S2, S3 in the steering wheel assembly 18. The first, second and third sensors S1, S2, S3 are angular and rotational sensors or rotary motion sensors respectively adapted to indicate steering wheel rotation, steering column rake, and steering column telescoping. As understood by those skilled in the art, rotary motion sensors (term used interchangeably with angular and rotational sensors) measure the rotational movement of objects to determine their angular displacement, speed, and direction of rotation. The plurality of sensors S may include fourth and fifth sensors S4, S5 in the foot pedal assembly 20. The fourth and fifth sensors S4, S5 are linear actuators with respective position feedback mechanisms for angular adjustment and for longitudinal adjustment. The plurality of sensors S may include sixth, seventh and eighth sensors S6, S7, S8 in the seat assembly 16. The sixth, seventh and eighth sensors S6, S7, S8 are rotary motion sensors respectively adapted to indicate seat back angle adjustment, seat longitudinal adjustment, and seat height adjustment.

Referring to FIG. 1, the apparatus 10 includes a microcontroller 30 that is hardwired or directly connected or otherwise integrated with the physical entity 12. The microcontroller 30 has a first processor 32 and a first tangible, non-transitory memory 34 on which instructions are recorded for selectively executing method 100, shown in FIG. 2. The memory 34 can store controller-executable instruction sets, and the processor 32 can execute the controller-executable instruction sets stored in the memory 34. The microcontroller 30 is configured to map respective baseline positions for the plurality of sensors S.

Referring to FIG. 1, the apparatus 10 includes a virtual reality controller 40, referred to herein as VR controller 40, in electronic communication with the microcontroller 30. The VR controller 40 has a second processor 42 and a second tangible, non-transitory memory 44. The memory 44 can store controller-executable instruction sets, and the processor 42 can execute the controller-executable instruction sets stored in the memory 44. The VR controller creates a digital twin 50 of the physical entity based on a baseline position of the reference points. The digital twin 50 is a surrogate of the physical entity 12.

The sensor data is used to update the digital twin 50. The VR controller 40 generates an updated digital twin by updating a respective virtual position value in the digital twin based on the unique letter code. In other words, when a portion of the physical entity 12 moves in the real world, the corresponding virtual portion is also moved in the virtual world. The updated digital twin 52 is transmitted to a virtual reality medium or a mixed reality medium. The VR controller 40 utilizes a specific format of commands over a communication protocol to relay information from the physical entity 12 to a virtual target or digital twin 50 to align the two when utilizing a virtual reality medium and/or a mixed reality medium, providing a seamless user experience.

In one example, the apparatus 10 may include a screen or monitor 54 in communication with the VR controller. Here, the updated digital twin 52 is transmitted to and displayed on the monitor 54 for viewing by the user U. In another example, the apparatus 10 may include a head-mounted display 56 is in communication with the VR controller 40. The updated digital twin 52 is transmitted to and displayed on the head-mounted display 56 for the user U. The VR controller 40 is adapted to control operation of the physical entity 12 based in part on the updated digital twin 52.

Figure 4:
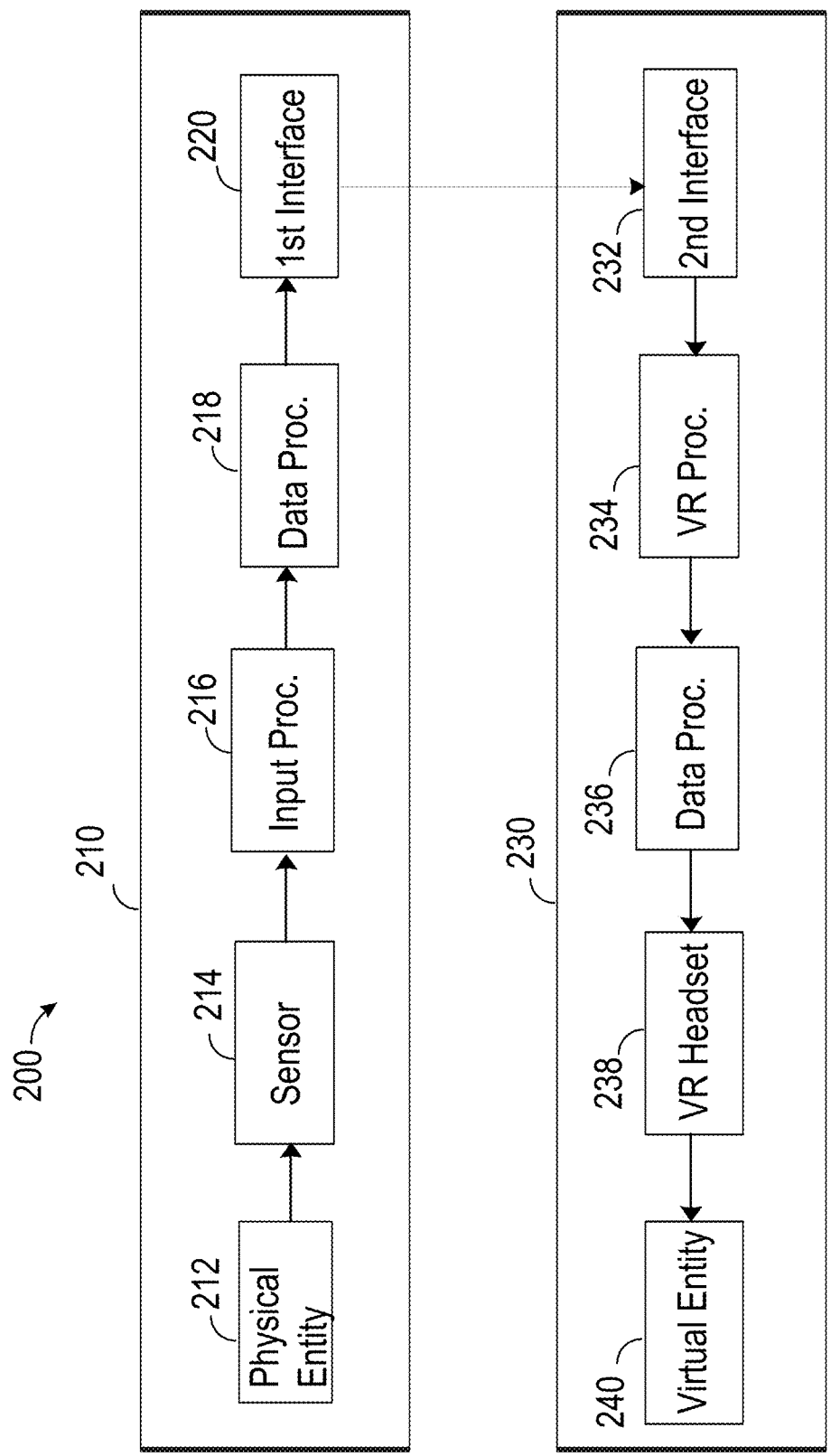
FIG. 4 is a schematic diagram of an example modular architecture employable in the apparatus of FIG. 1.

An example overall architecture 200 for the apparatus 10 is shown in FIG. 4. FIG. 4 illustrates a physical environment 210 having a physical entity 212 and a virtual environment 230 having a virtual entity 240. Referring to FIG. 4, a plurality of sensors 214 (e.g., a potentiometer, an encoder) is mounted to the physical entity 212 for the purpose of obtaining sensor data which is sent to an input processor 216 (e.g., Arduino, Raspberry Pi etc.) for processing. As noted above, the sensors S are assigned a priority ranking. For example, this priority ranking allows for updates to virtual targets in the field-of-view of a user U before updates that are out of the field-of-view view of the user.

Referring to FIG. 4, the input processor 216 transmits the data to first software processor 218 (e.g., C, C++, Python etc.) and then onto a first communication interface 220 (e.g., serial port 60). The first communication interface 220 transmits the data onto a second communication interface 232 (e.g., serial port 60) in the virtual environment 230. Referring to FIG. 4, the second communication interface 232 transmits the data to a virtual reality processor 234 (e.g., VRED, Unreal Engine etc.) that creates a simulated computer-generated environment. Using the unique letter code (encoded in the data packet) to separate incoming data, valid data is routed to corresponding virtual models, updating their position with the position contained in the data packet. The data is transferred to a second software processor 236 (e.g., for format conversion) before being transmitted to a virtual reality head-mounted display 238 for displaying the virtual entity 240.

Figure 2:
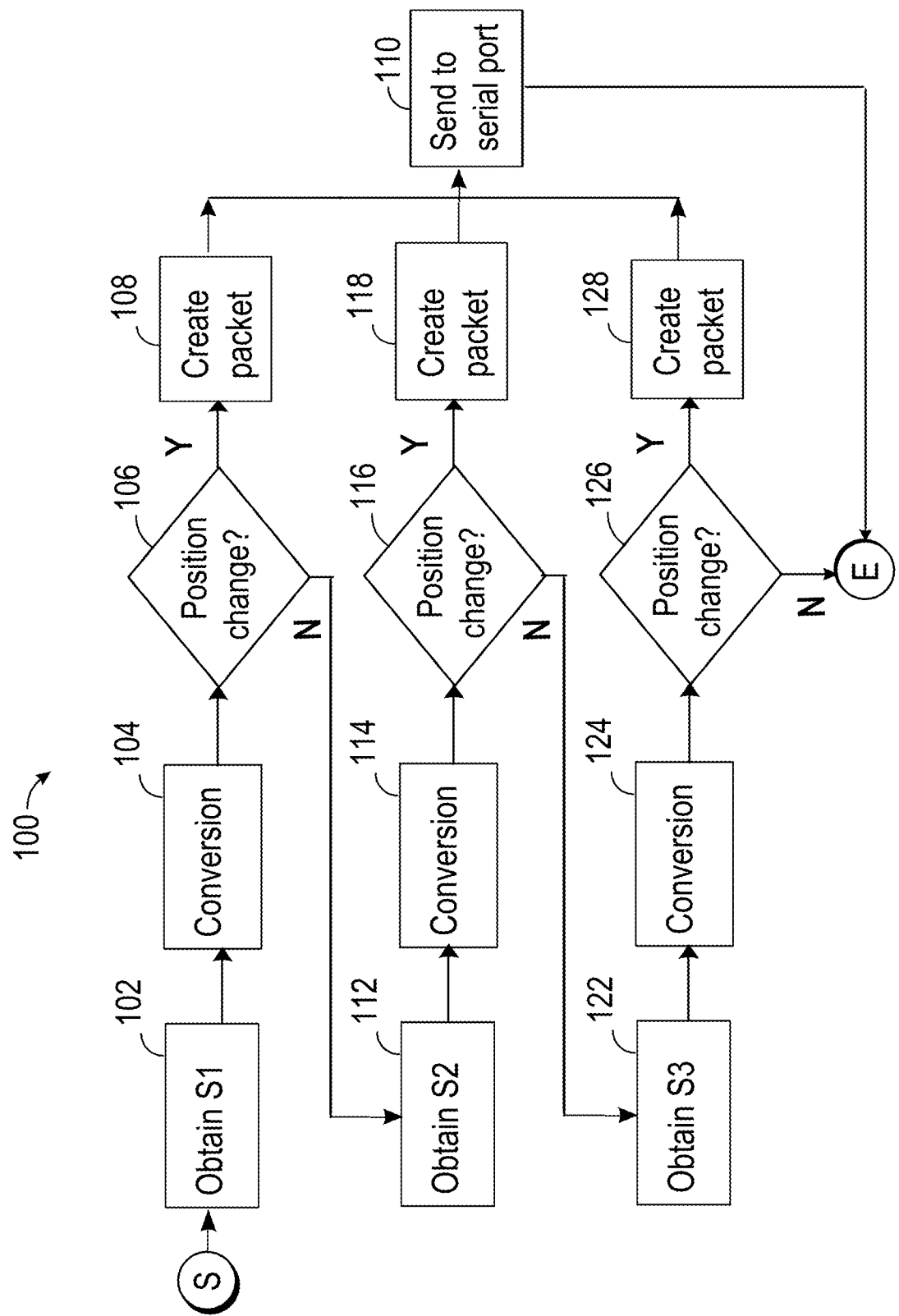
FIG. 2 is a flowchart for a first method executable by the microcontroller of FIG. 1.

Referring now to FIG. 2, an example flowchart of the first method 100 is shown. Method 100 may be embodied as computer-readable code or instructions. Method 100 need not be applied in the specific order recited herein. Furthermore, it is to be understood that some steps may be eliminated. Method 100 may be executed in real-time, continuously, systematically, sporadically and/or at regular intervals.

Method 100 begins at block 102 of FIG. 2, where the microcontroller 30 is programmed to obtain sensor data from the sensor with the highest priority. In the example shown, the order of priority designates sensor S1 with the highest priority. In one embodiment, there is at least one sensor (from the plurality of sensors S) respectively positioned along first, second and third orthogonal axes XYZ. The sensors S may include at least one accelerometer and/or gyroscope for tracking position and orientation.

Advancing to block 104, the sensor data from sensor S1 is sent to an analog-to-digital converter to convert the sensor voltage into a bit-value in a form that the microcontroller 30 can identify. The respective bit-value is dependent on a respective output voltage of the plurality of sensors S. Here, the bit-value is dependent on the output voltage of the sensor S1. Immediately following the voltage-to-bit-value conversion, the bit-value is converted into a current position value, e.g. in millimeters.

Proceeding to block 106, the method 100 includes determining if the current position value has deviated from the respective baseline position value of an item. In other words, once the current position value is obtained, the microcontroller 30 looks for which positions have changed, in the predefined order of priority. For example, the order of priority may begin with the items that are directly in the field-of-view of the user U.

If the current position value has deviated (block 106=YES), the method 100 advances to block 108, where a data packet is created, which includes a unique code with at least two-letters describing what item has moved, along with the current numeric position coordinate of the item that moved. The unique letter code includes a first letter encoding an axis of movement of the item, and a second letter encoding an identity of the item. The data packet further includes a current numeric position coordinate of the item. Advancing to block 110 from block 108, the data packet is then sent to the VR controller 40. The data packet may be transmitted to the VR controller 40 through a universal serial bus (USB) port 60 adapted to interface with the microcontroller 30 and the VR controller 40. The data packet may be transmitted to the VR controller 40 through a wired method of communication via a protocol available to those skilled in the art, e.g., wireless network 46. A first iteration of method 100 is ended and the method 100 may be executed again for the next iteration.

The wireless network 46 may be a short-range network or a long-range network. The wireless network 46 may be a communication BUS, which may be in the form of a serial Controller Area Network (CAN-BUS). The wireless network 46 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 46 may be a Wireless Local Area Network (LAN) which links multiple devices using a wireless distribution method, or a Wireless Metropolitan Area Network (MAN) which connects several wireless LANs. Other types of network technologies or communication protocols available to those skilled in the art may be employed.

If there is no change in position (block 106=NO), the method 100 proceeds to block 112 to obtain sensor data from the next sensor (e.g., sensor S2) in the predefined priority order. In other words, if the position of the most prominent items have not changed, then items with less priority are checked to see if movement occurred, and if so, data is sent in the same manner. Method 100 advances to block 114 from block 112. Method 100 advances to block 114 from block 112. Blocks 104, 114 and 124 are similar. Per block 114, the sensor data is transmitted to an analog-to-digital converter (which may be integrated within the microcontroller 30) to convert the sensor voltage into a respective bit-value. The bit-value is converted into a current position value, e.g. in millimeters.

Blocks 106, 116 and 126 are similar. Proceeding to block 116, the method 100 includes scanning for changes in position from the respective baseline position value, via the microcontroller 30. Blocks 108, 118 and 128 are similar. If the current position value has deviated (block 116=YES), the method 100 advances to block 118, where a data packet is created, which includes a unique code with at least two-letters describing what item has moved, along with current numeric position value. Advancing to block 110 from block 118, the data packet is then sent to the VR controller 40. If there is no change in position (block 116=NO), the method 100 proceeds to block 122 to obtain sensor data from the next sensor (e.g., sensor S3) in the predefined priority order and proceeds in the same manner (to blocks 124, 126, 128) as described above.

Figure 3:
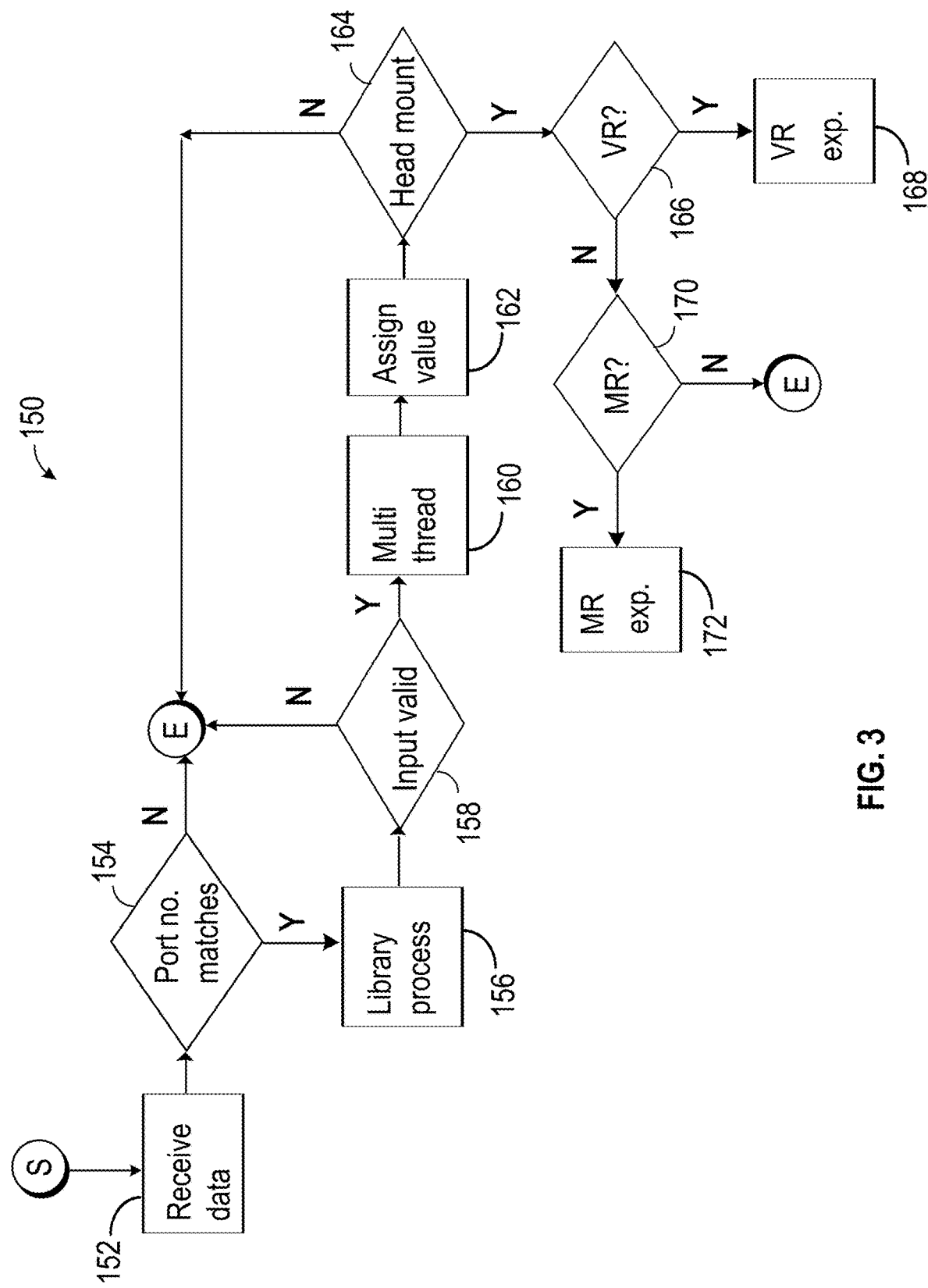
FIG. 3 is a flowchart for a second method executable by the VR controller of FIG. 1.

Referring now to FIG. 3, an example flowchart of the second method 150 is shown. Method 150 may be embodied as computer-readable code or instructions stored on and at least partially executable by the VR controller 40. Method 150 need not be applied in the specific order recited herein. Furthermore, it is to be understood that some steps may be eliminated. Method 150 may be executed in real-time, continuously, systematically, sporadically and/or at regular intervals.

Per block 152 of FIG. 3, the VR controller 40 receives incoming data from the microcontroller 30, including a serial port number. Advancing to block 154, the VR controller 40 determines if the port number matches the predefined system requirements. If the port number does not match (block 154=NO), the method 150 ends (and the process is re-started from the beginning).

If the port number matches (block 154=YES), the method 150 proceeds to block 156 where a python serial library is called to process the data input. Method 150 advances to block 158 from block 156. Block 158 includes determining whether input data is valid. This is done by examining the unique letter code. The input data is deemed valid if the letters in the letter code have a corresponding match in the VR software. If the input data is not valid (block 158=NO), the method 150 ends. If the input data is valid (block 158=YES), the method 150 proceeds to block 160, where a multi-threading library is called to handle each data individually. The multithreading library creates two threads—a first thread to process the received data, and a second thread to operate the user interface 62 or front end of the VR software running. Also, per block 160, the data is decoded and sent to different categories.

Advancing to block 162 from block 160, the decoded data is assigned to various elements. This may be done through a compatible application programming interface (API) that allows the Python script to communicate with the virtual reality software in the VR controller 40. Advancing to block 164 from block 162, the VR controller 40 asks the user U (via the user interface 62, for example) whether the data is to be used in a head-mounted display 56. If not (block 164=NO), the method 150 ends. If so (block 164=YES), the method 150 proceeds to block 166 to ask, via the user interface 62, if the user U would like a virtual reality platform. The user interface 62 allows selection of a virtual reality or a mixed reality platform and assigns the data to whichever one that the user U chooses.

A mixed reality environment enables a user to manipulate virtual elements as if they were physically present, by incorporating real-world physical properties into the virtual overlay. In the context employed here, in a mixed reality experience, the user U may view their own bodies during the interaction with the virtual world. For example, the user U may steer the steering wheel with their own hands. In contrast, in a virtual reality experience, the user U does not view their own body during the interaction.

If the user U selects a virtual reality platform (block 166=YES), the method 150 proceeds to block 168 to set up a virtual reality experience. If not (block 166=NO), the method 150 proceeds to block 170 to ask if the user U would like a mixed reality platform. If not (block 170=NO), the method 150 ends. If the user U selects a mixed reality platform (block 170=YES), the method 150 proceeds to block 172 to set up a mixed reality experience.

In summary, the apparatus 10 enables tracking of a real-life object or physical entity 12 using a plurality of sensors S. The sensors S scan the environment to map out the physical space and track movements in the physical entity 12. The sensors S are assigned a priority ranking to determine which virtual reference points or targets to update first in the digital twin 50. If a change in the highest-ranking sensor is detected, a data packet is created. If no change is detected, the microcontroller 30 moves down the priority list until a position change is detected. The positions from each of the plurality of sensors S is tagged with a unique letter code (e.g., a two-letter) to identify the item that is being moved. The unique letter code and position data may be formatted as a string. Once tagged, the positions may be sent via a communication protocol (Serial, CAN, etc.) to the VR controller 40 either via a wired connection or a wireless network.

The VR controller 40 (for example, through a custom python script) accepts the incoming position data and uses the assigned unique letter code plus the position data to decode what part of the real-life object or physical entity 12 is moving, and the current position that the physical entity 12 occupies. Once the VR controller 40 (e.g., through the python script) has this information, a virtual reality software with a compatible application programming interface (API) may be employed to update a digital twin of the physical entity 12 with the correct position/orientation. Using the updated digital twin, a user U may remotely visualize and assess the position/orientation of the physical entity 12 and modify or control the physical entity 12 according to that information.

In some embodiments, the physical entity 12 may be part of a vehicle V which may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), train or another moving platform. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The microcontroller 30 and VR controller 40 of FIG. 1 respectively include a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An apparatus comprising:
   a physical entity and a plurality of sensors operatively connected to the physical entity;
   a microcontroller integrated with the physical entity and having a first processor and a first tangible, non-transitory memory, the microcontroller being configured to map a respective baseline position of the plurality of sensors;
   a virtual reality (VR) controller in communication with the microcontroller and having a second processor and a second tangible, non-transitory memory, the VR controller being adapted to create a digital twin of the physical entity;
   wherein the microcontroller is configured to receive sensor data from the plurality of sensors, the sensor data being converted into a respective position value;
   wherein the microcontroller is configured to determine, in a predefined priority order, if the respective position value has deviated from the respective baseline position of an item and create a respective data packet with a unique letter code when the respective position value has deviated;
   wherein the VR controller is adapted to:
      receive incoming data from the microcontroller and route the incoming data based in part on the unique letter code;
      generate an updated digital twin by updating a respective virtual position value in the digital twin based on the unique letter code; and
      transmit the updated digital twin to a virtual reality medium or a mixed reality medium and control operation of the physical entity in real-time based in part on the updated digital twin.

2. The apparatus of claim 1, wherein the unique letter code includes a first letter encoding an axis of movement of the item, and a second letter encoding an identity of the item, the data packet further including a current numeric position coordinate of the item.

3. The apparatus of claim 2, wherein converting the sensor data into a respective position value includes:
   transmitting the sensor data to an analog-to-digital converter for conversion into a respective bit-value, the sensor data being sorted in the predefined priority order; and
   converting the respective bit-value into the respective position value, the respective bit-value being dependent on a respective output voltage of the plurality of sensors.

4. The apparatus of claim 2, wherein the predefined priority order prioritizes respective items in a predefined field-of-view of a user relative to the respective items that are not in the predefined field-of-view.

5. The apparatus of claim 1, wherein the VR controller is adapted to:
create a first thread and a second thread via a multithreading library such that the first thread processes the incoming data, and the second thread operates a user interface of the VR controller.

6. The apparatus of claim 1, further comprising:
a head-mounted display in communication with the VR controller; and
wherein the updated digital twin is transmitted to and displayed on the head-mounted display.

7. The apparatus of claim 5, further comprising:
a monitor in communication with the VR controller; and
wherein the updated digital twin is transmitted to and displayed on the monitor.

8. The apparatus of claim 5, further comprising:
a universal serial bus (USB) port adapted to interface with the microcontroller and the VR controller, the VR controller being adapted to receive the incoming data from the USB port.

9. The apparatus of claim 1, wherein the plurality of sensors include an accelerometer and/or a gyroscope, the plurality of sensors including at least one sensor respectively positioned along first, second and third orthogonal axes.

10. The apparatus of claim 1, wherein the physical entity includes a seat assembly and a steering wheel assembly, the plurality of sensors including rotary motion sensors in the steering wheel assembly respectively adapted to indicate steering column rake, steering column telescoping, and steering wheel rotation.

11. The apparatus of claim 10, wherein the plurality of sensors include rotary motion sensors in the seat assembly respectively adapted to indicate seat back angle adjustment, seat longitudinal adjustment, and seat height adjustment.

12. The apparatus of claim 10, wherein:
the physical entity includes a foot pedal assembly; and
the plurality of sensors include linear actuators in the foot pedal assembly, the linear actuators being adapted to indicate angular adjustment and longitudinal adjustment.

13. A method for controlling operation of a physical entity in an apparatus having a microcontroller with a first processor and a first tangible, non-transitory memory, and a virtual reality (VR) controller having a second processor and a second tangible, non-transitory memory, the method comprising:
connecting a plurality of sensors to the physical entity;
integrating the microcontroller with the physical entity and mapping a respective baseline position of the plurality of sensors, via the microcontroller;
creating a digital twin of the physical entity, via the VR controller;
converting sensor data from the plurality of sensors into a respective position value, via the microcontroller;
determining, in a predefined priority order, if the respective position value has deviated from the respective baseline position of an item, via the microcontroller;
creating a respective data packet with a unique letter code when the respective position value has deviated from the respective baseline position, via the microcontroller;
receiving incoming position data from the microcontroller and routing the incoming position data based in part on the unique letter code, via the VR controller;
generating an updated digital twin by updating a respective virtual position value in the digital twin based on the unique letter code, via the VR controller; and
transmitting the updated digital twin to a virtual reality medium or a mixed reality medium and control operation of the physical entity in real-time based in part on the updated digital twin, via the VR controller.

14. The method of claim 13, further comprising:
including a first letter and a second letter in the unique letter code, the first letter encoding an axis of movement of the item and the second letter encoding an identity of the item, the data packet further including a current numeric position coordinate of the item;
transmitting the sensor data to an analog-to-digital converter for conversion into a respective bit-value, via the microcontroller, the sensor data being sorted in the predefined priority order;
converting the respective bit-value into the respective position value, the respective bit-value being dependent on a respective output voltage of the plurality of sensors; and
prioritizing respective items in a predefined field-of-view of a user relative to the respective items that are not in the predefined field-of-view in the predefined priority order.

15. The method of claim 13, further comprising:
creating a first thread and a second thread via a multithreading library in the VR controller such that the first thread processes the incoming position data, and the second thread operates a user interface of the VR controller.

16. The method of claim 15, wherein the apparatus includes a head-mounted display, further comprising:
displaying the updated digital twin on the head-mounted display.

17. The method of claim 15, wherein the apparatus includes a monitor, further comprising:
displaying the updated digital twin on the monitor.

18. The method of claim 13, further comprising:
transmitting the incoming position data to the VR controller via a universal serial bus (USB) port interfacing with the microcontroller and the VR controller; and
positioning at least one sensor respectively from the plurality of sensors along first, second and third orthogonal axes.

19. The method of claim 13, further comprising:
including a seat assembly, a foot pedal assembly and a steering wheel assembly in the physical entity, the plurality of sensors having respective rotary motion sensors and respective linear actuators;
indicating steering column rake, steering column telescoping, and steering wheel rotation via the respective rotary motion sensors in the steering wheel assembly;
indicating seat back angle adjustment, seat longitudinal adjustment, and seat height adjustment via the respective rotary motion sensors in the seat assembly; and
indicating angular adjustment and longitudinal adjustment via the respective linear actuators in the foot pedal assembly.

20. A vehicle comprising:
a physical entity and a plurality of sensors operatively connected to the physical entity;
a microcontroller integrated with the physical entity and having a first processor and a first tangible, non-transitory memory, the microcontroller being configured to map a respective baseline position of the plurality of sensors;

a virtual reality (VR) controller in communication with the microcontroller and having a second processor and a second tangible, non-transitory memory, the VR controller being adapted to create a digital twin of the physical entity;

wherein the microcontroller is configured to:
receive sensor data from the plurality of sensors, the sensor data being converted into a respective position value;

determine, in a predefined priority order, if the respective position value has deviated from the respective baseline position of an item and create a respective data packet when the respective position value has deviated, the respective data packet including a unique letter code encoding an axis of movement of the item and an identity of the item, the respective data packet including a numeric position coordinate of the item;

wherein the VR controller is adapted to:
receive incoming position data from the microcontroller and route the incoming position data based in part on the unique letter code;

generate an updated digital twin by updating a respective virtual position value in the digital twin based on the unique letter code; and transmit the updated digital twin to a virtual reality medium or a mixed reality medium and control operation of the physical entity based in part on the updated digital twin in real-time.

* * * * *